E. C. SHAW.
VEHICLE WHEEL RIM.
APPLICATION FILED JAN. 6, 1906.

926,296.

Patented June 29, 1909.
4 SHEETS—SHEET 1.

WITNESSES:
Oliver Williams
Larry J. Sanders

INVENTOR
Edwin Copland Shaw
BY
Seward Davis
ATTORNEY

THE NORRIS PETERS CO., WASHINGTON, D.C.

E. C. SHAW.
VEHICLE WHEEL RIM.
APPLICATION FILED JAN. 6, 1906.

926,296.

Patented June 29, 1909.
4 SHEETS—SHEET 2.

WITNESSES:
Oliver Williams
Harry T. Sanders

INVENTOR
Edwin Copland Shaw
BY
Seward Davis
ATTORNEY

THE NORRIS PETERS CO., WASHINGTON, D. C.

E. C. SHAW.
VEHICLE WHEEL RIM.
APPLICATION FILED JAN. 6, 1906.

926,296.

Patented June 29, 1909.
4 SHEETS—SHEET 4.

WITNESSES:

INVENTOR
Edwin C. Shaw
BY
Seward Davis
ATTORNEY

UNITED STATES PATENT OFFICE.

EDWIN COUPLAND SHAW, OF AKRON, OHIO, ASSIGNOR TO THE B. F. GOODRICH COMPANY, OF AKRON, OHIO, A CORPORATION OF OHIO.

VEHICLE-WHEEL RIM.

No. 926,296.    Specification of Letters Patent.    Patented June 29, 1909.

Application filed January 6, 1906. Serial No. 294,831.

*To all whom it may concern:*

Be it known that I, EDWIN COUPLAND SHAW, a citizen of the United States, residing in the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims which are adapted for use with tires of resilient material, and more particularly to rims having detachable portions so constructed that the tire may readily be attached to and removed from the tire-seating portion of the rim or channel and yet, when the detachable portion is in place, the rim as a whole has substantially the strength of an integral structure and is capable of withstanding the great expansive force of the air confined in the tires (when a pneumatic form of tire is used) such as those used on even the heaviest automobiles and vehicles and is capable of holding the tire firmly in place in spite of the violent strains and impacts to which the rim and tire are subjected in the use of such vehicles.

The form of rim which has been used for many years in connection with pneumatic tires has had its edges provided with flanges which are of varying forms according to the style of tire intended to be used. The flanges may be straight, or outwardly curved, or upwardly and inwardly turned, in which latter form they are used with "clencher" tires to inclose and hold the "beads" of the tire. These flanges have commonly been made integral with the tire-seating portion of the rim or channel; such construction possesses great strength and is simple in form, having no parts requiring adjustment and likely to get out of order. Such an integral rim has, however, a marked disadvantage in that it is difficult to apply the tire to, and remove it from, the rim. Thus, the diameter of the wheel measured to the extremity of the flanges is considerably greater than the diameter measured to the portion of the rim between the flanges and against which the tire seats; therefore, the tire or tire casing, when being applied to or removed from the rim, must be stretched over the flanges, which is an operation attended with considerable difficulty even when the tire or tire casing is made of material adapted to be somewhat stretched, and this difficulty prohibits the use of tires of non-stretchable or non-extensible materials. These particular difficulties have been obviated by making one of the flanges removable; when the flange is removed the tire is slipped on the remaining portion of the rim and the flange, which has been removed, is then put back in place and fastened to the rest of the rim in some manner. Such construction assists in the ready application and removal of the tire, but it introduces other difficulties, namely, those involved in the means by which the removable flange is to be attached to the tire-seating portion of the rim herein referred to as the channel or channel iron. In bicycle wheels and other wheels adapted to carry light tires and support but light loads, the particular means used for fastening the removable flange are of comparatively little importance, for the expansive force of such tires and the strains to which they are subjected in the use of light vehicles can readily be withstood. In automobiles and vehicles adapted for heavy truck work, however, the problem becomes a much more serious and complicated one.

In all of the constructions involving removable flanges, known to me prior to my invention set forth herein, the flange is held to the rest of the rim by means of screws, latches or bolts and nuts, applied in one manner or another, which constructions are objectionable for a number of reasons, among which are, first, that the flange in none of these forms of construction is so applied that it results in a structure approximating the strength of an integral rim, the number and the character of the parts introducing serious weakness; second, that the screws or nuts either tend to work loose under the vibrations experienced in use, or become rusted when subjected to moisture and are very difficult to remove, and, third, the number of the parts used in such constructions render them complicated and the loss of any of the parts seriously interferes with or entirely prevents the operation of the device.

The object of my invention is to provide a vehicle wheel rim having a detachable tire flange which can be easily and quickly applied to and removed from the channel of such rim, and to provide means for positively locking the flange to the channel, which shall be integral with or formed in or upon the said channel and flange, obviating the need of using latches, bolts and nuts or screws, or like fastening devices.

In my improved rim a tire flange is formed upon a detachable ring transversely split at one or more points, and this ring is adapted to lie in a circumferential groove in the main portion of the rim, means being provided for locking the ends of the ring or of the several portions thereof directly to the remaining portion of the rim, the said locking means being integral with the parts, as distinguished from using screws or nuts for this purpose, and as distinguished from merely locking or drawing together the ends of the ring, or the portions thereof. In my construction, though the flange is removable, yet when applied to the rest of the rim, it forms a complete structure which is substantially as strong as an integral rim.

My improvement may be embodied in many different specific forms, some of which I have illustrated in the accompanying drawings, the form of the locking means, in particular, admitting of numerous variations within the spirit of my invention.

Referring generally to the drawings, Figs. 6, 7, 8 and 9 illustrate a second form, and Figs. 11 and 12 a third form. Fig. 10 is a perspective view of a preferred form of valve and dust-cap adapted for use with these forms.

Throughout the several figures, like reference numerals indicate like parts.

Figure 1:
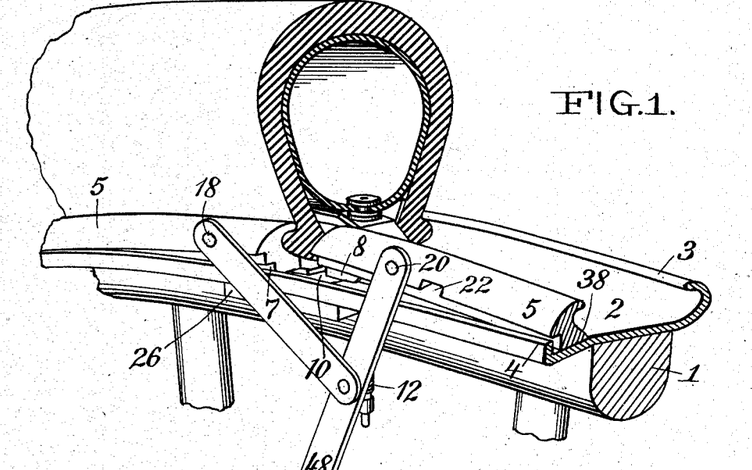
Figure 1 is a perspective view showing a section of a "clencher" form of tire illustrating generally the means of applying my improved construction to this form of tire, though it will be understood that the tire and the flanges may be of other forms and still embody my invention.

Fig. 1, as stated, is a perspective view of a section of a wheel felly, 1, carrying a channel 2, of the clencher type, having an upwardly projecting in-turned flange or clench 3 formed integrally therewith, and a second upwardly projecting flange, 4, likewise integral with said channel, formed upon a downwardly tending extension of the channel, so that the upper edge of said flange 4 is of the same elevation as that portion of the channel seated on the felly. The clench or flange 5 opposed to the clench 3 is formed upon and integral with a split ring adapted to seat upon the channel 2 within the flange 4, and to be held against lateral displacement by the engagement of its base portion 38 with the said secondary flange 4. Upon or adjacent to the extremities of the split ring and integral therewith are formed downwardly projecting lugs 7 and 8, whose form and construction are more particularly shown in Fig. 4. In Fig. 1 is also shown a dust proof housing 26, formed integral with the channel 2 and adapted to inclose the locking means formed upon the split ring and the channel when engaged, more clearly shown in Figs. 2 and 3. In Fig. 1 is also shown a pivoted lever 48, intended for use in drawing together the separated ends of the split ring in assembling same, by means of the studs 18 and 20 which are placed in recesses 19 and 21, shown in Fig. 3, and by means of which the ends are brought together as hereinafter more fully described. A preferred form of valve and valve stem 12 is also shown herein, and, in modified form, more fully illustrated in Fig. 10.

Figures 2, 3, 4, 5:
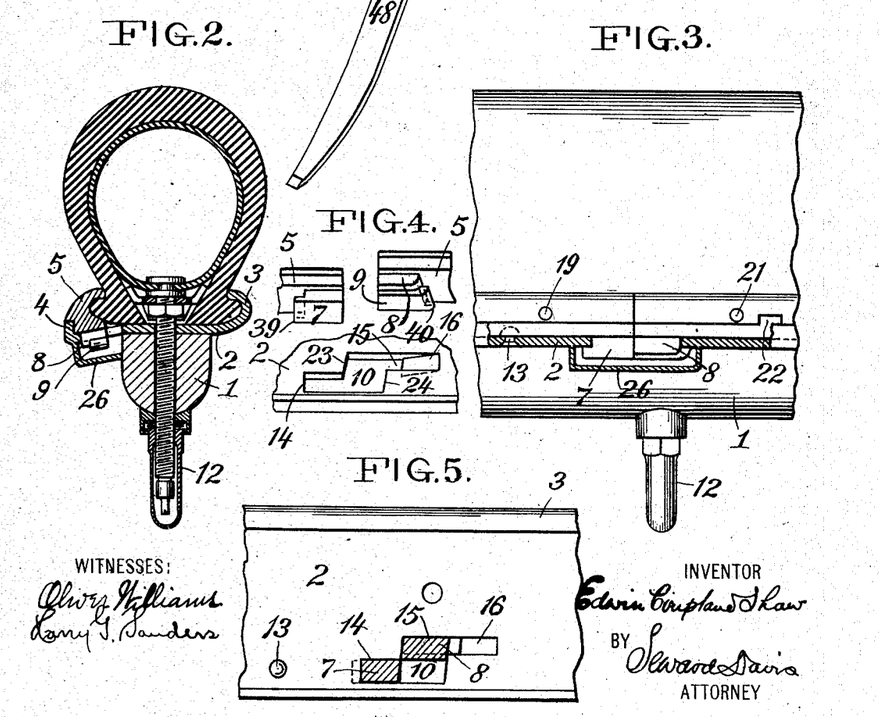
Figs. 2, 3, 4 and 5 are various views illustrating one embodiment of my invention.

Fig. 2 represents a cross-sectional view through the felly 1, channel 2, detachable flange 5, stepped lug 8, 9 and casing or housing 26.

Fig. 3 is a side elevation of the parts shown in Fig. 2, with the channel 2 and casing 26 broken away to disclose the locking means in engagement.

Fig. 4 is a detail perspective view of the locking means when disengaged. These means as here illustrated comprise the lug 7 formed integral with and at the extremity of one end of the split ring 5. This lug has a backwardly projecting hook 39 adapted to take under the channel 2 when the lug 7 is seated in the slot 14. The other extremity of the split ring 5 carries a second lug 8, formed integral therewith. This lug 8 has a stepped portion 9 which forms a backwardly projecting hook 40 adapted to take under the channel 2 when the lug 8, 9 is seated in the slot 10 at 24. The section of the channel 2 here shown contains an offset slot 10, shown in plan at Fig. 5. This slot has a double offset, one offset 14 terminating in an edge forming right angles with the sides; the other offset 15 terminates in an inclined groove or guide 16 adapted to facilitate the entry of the stepped lug 8, 9. The central portion of the slot 10 has parallel sides, the transverse edges 23, 24 inclining toward the offset containing the guide 16, to permit of a wedging contact when the lug 8, 9 enters into alinement with the previously seated lug 7.

Fig. 5 is a plan view of a section of the channel, showing the slot 10, and, in section, the lugs 7 and 8. As here shown, the lug 7 is first inserted in the slot, seated therein and the split ring then rotated until the hook 39 of the lug takes under the edge of the slot 14. The hinged lever then being applied and the other extremity of the split ring drawn forward, the stepped lug 8, 9 is brought into register with the offset 15 of the slot 10 and the lug is guided by the groove 16 into the slot 10, as shown in Fig. 5, and the lug is there seated, ready to be forced over or sprung into alinement with the lug 7, the hooked portion 40 ready to take under the edge 24. The lug 8 is then pulled over until it seats in the slot 10 in true alinement with the lug 7 against which it is wedged by the inclination of the walls 23 and 24, as shown in Fig. 3. The housing 26 is a four-walled casing, having its remaining side closed by the felly 1, and thus affording protection to the inclosed locking parts from moisture and dirt. To facilitate ready removal of this split ring flange, a recess 22 is provided for the insertion of a prying tool, such as the handle extremity of the lever 48, so that when the extremities of the ring and lugs are sprung out of contact, the end of the ring last seated, 8, may be readily raised and the flange removed by rotating the hook 39 out of engagement with the channel. The boss 13 shown in Figs. 3 and 5 is intended to seat in a recess in the ring to assist in centering and alining the extremity of the split ring after its lug 7 is seated in the slot 14.

Figures 6, 7, 8, 9, 10, 11, 12:
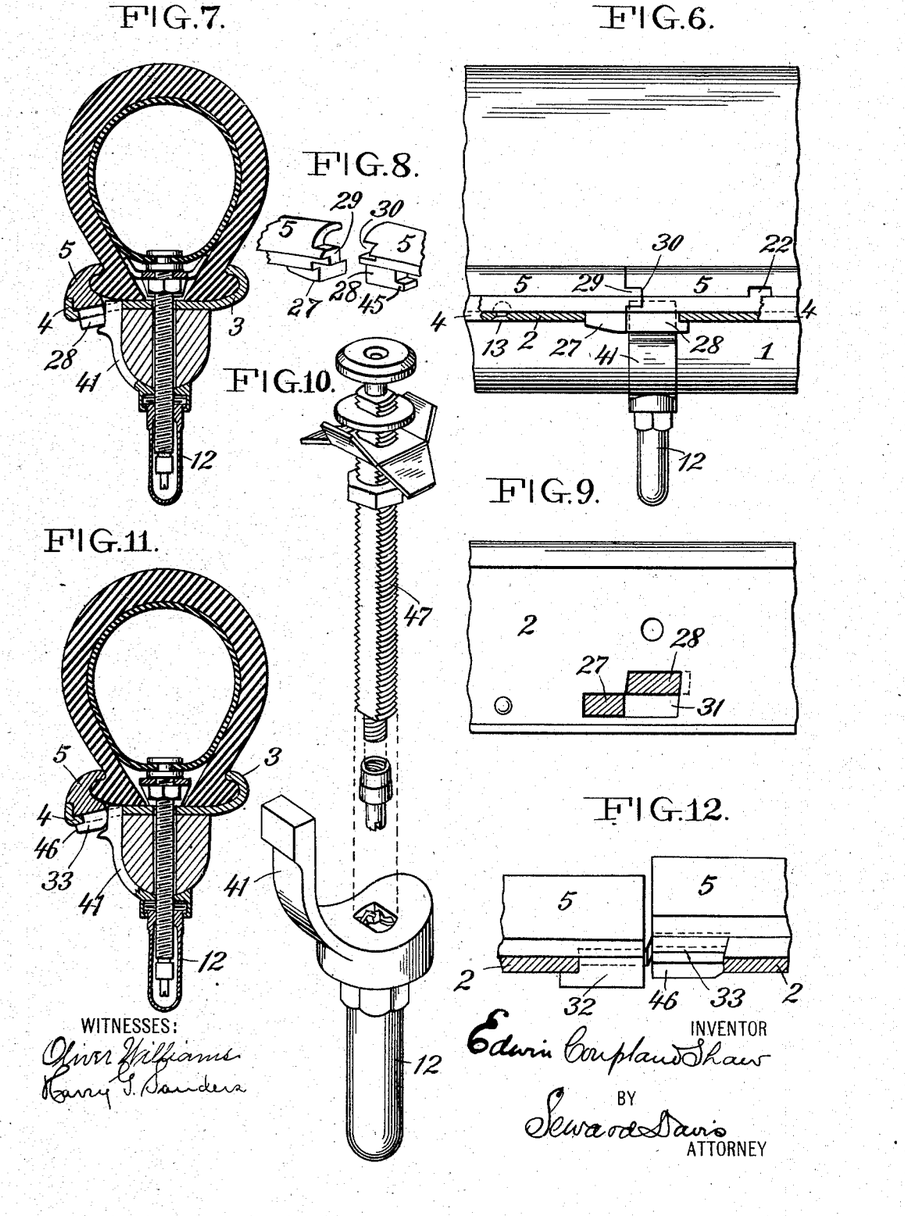

The second group of figures illustrating a modified form of locking means is comprised in Figs. 6, 7, 8 and 9. Fig. 6 shows a view in elevation of this modified form of locking means applied to a clencher tire, with the rim in section, the secondary flange 4 being broken away. In this embodiment of my invention, a third locking member, 41, is employed as a key piece, as more clearly shown in Fig. 7, which is a cross-sectional view of the parts as illustrated in Fig. 6. In Fig. 7 this key piece 41 is shown partly in section as a curved shaft conforming to the felly, and terminating at its upper end in a right-angled head adapted to fit that portion of the slot 31 shown in Fig. 9, left open when the lug 28 is alined with the lug 27 and so prevent movement of the seated lugs. The lower end of the key piece 41 terminates, preferably as shown, in a washer having a downwardly extending flange, or circular wall, within which the dust-cap 12 is swiveled, as shown in Fig. 10. Fig. 8 illustrates, in conjunction with Fig. 9, the locking means of this alternative construction in detail. The extremities of the split ring flange 5, 5, have mutually engaging locking means, 29 being the pin and 30 the socket members thereof, forming a dove-tail joint therebetween. The extremity bearing the male portion 29, has a lug 27, downwardly projecting therefrom, adapted to enter the offset slot 31 (Fig. 9), and to seat therein, as shown in Fig. 7. The opposed extremity of the flange 5 carrying the female member 30 has a downwardly extending lug 28 with a backwardly extending hook 45 formed thereon, adapted to enter the slot 31 (Fig. 9). Fig. 9 shows the offset slot 31, having its offset walls parallel and forming obtuse angles with the longer sides. The lugs are shown therein, the lug 28 having been first inserted, its hooked portion taking under the edge of the channel, as shown in dotted outline. The lug 27 is then inserted as shown. The projection 29 and socket 30 are then in register and the lug 28 may be sprung into alinement with the lug 27, the hooked lug 28 serving to lock the ring to the channel and the dovetail joint formed by 29 and 30 serving to lock the two extremities positively and securely together. The key piece 41 is then inserted and forms a safety-wedge, as shown in Figs. 6 and 7.

A third form of locking engagement substantially similar to that shown in Figs. 6, 7, 8 and 9 is illustrated in Figs. 11 and 12. Fig. 11 is a cross-sectional view of a vehicle wheel of the clencher tire type provided with this modification of my invention, which is illustrated more fully in Fig. 12. Fig. 12 shows a detail view in elevation of the extremities of a detachable split ring flange 5, 5 having the channel 2, 2 shown in section and broken away to show the lugs 32, 33, formed on said extremities. The essential difference between the locking means here shown and either of the forms heretofore described, resides in the formation upon the downwardly projecting lug 33, of a side flange 46 (Fig. 11) adapted to engage, when the lug is seated in the offset slot (shown in dotted outline in Fig. 12) under and be retained below the secondary flange 4 (Fig. 11). In practice the lug 32 is first seated in the offset slot of the channel 2, and the flange 5 rotated until the hook upon the lug 32 takes under the channel 2. The lug 33 is then seated in the offset portion of the slot and sprung into peripheral alinement with the lug 32, the lateral hook 46 upon the lug 33 taking under the channel 2 below the flange 4 (Fig. 11). A key piece 41 (Figs. 10 and 11) or safety-wedge is then inserted within the offset portion of said slot, and the dust-cap 12 screwed down on the valve stem 47 (Fig. 10) to lock the key-piece against escape from said slot, as before described.

Figure 13:
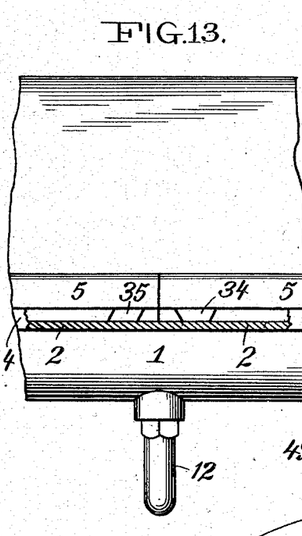
Figs. 13, 14, 15, 16 and 17 illustrate a further modification of my invention.
Figure 14:
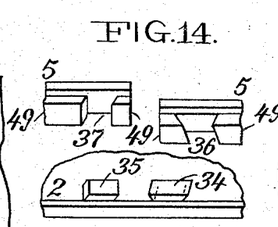
Figure 15:
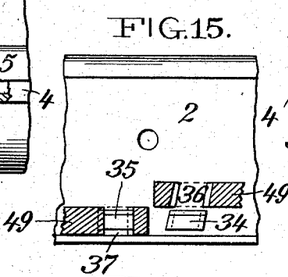
Figure 16:
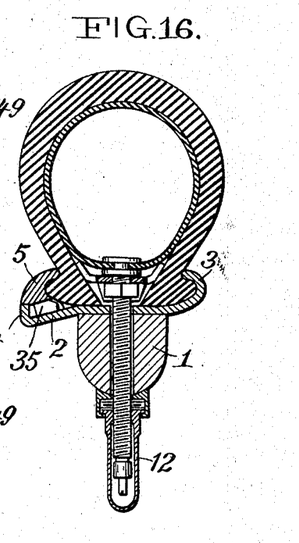
Figure 17:
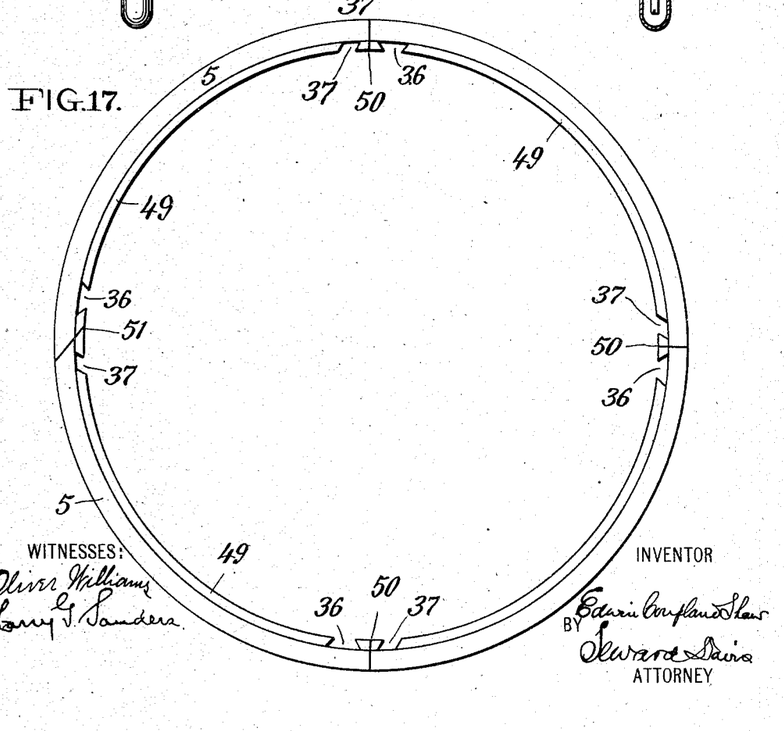

In Figs. 13 to 17 I have shown a further embodiment of my invention which I do not claim specifically herein, but which I have made the subject matter of a divisional application Serial No. 354,619 filed January 29, 1907. Fig. 13 shows a section in side elevation of a vehicle wheel having a detachable flange 5, a channel 2 carrying a secondary retaining flange 4, partly broken away to show the construction of the particular type of locking means, 34, 35 here employed. These locking means are shown in detail in Fig. 14, which represents in perspective the adjacent extremities of the split ring flange 5, 5, having a continuous downwardly projecting flange 49 formed thereupon and integral therewith, provided at or near said extremities with sockets 36, 37. These sockets differ in shape, and correspond to the upwardly projecting lugs 34 and 35, respectively, formed upon the floor of the channel 2 and integral therewith. The lug 35 is inclined toward the lug 34 which is fan-shaped, being narrower at its base than at its top, each being a rhombus. The front and rear sides of the lugs 34 and 35 are in the same respective parallel planes. Fig. 15 shows the method of locking the detachable split ring flange to the rim and shows a section of said channel in plan view with the continuous flange 49 formed on the flange 5 in section. That extremity of the flange 5 having the inclined slot 37 is first placed upon the channel 2, the lug 35 seated in said slot 37, the flange 49 hooking under said lug 35. The other extremity of the flange 5, having the recessed and diagonally inclined slot 36 is then placed on the channel 2, the lug 34 ready to be seated in said slot, 36, as shown in Fig. 15. The inclination of the faces of the lug 34 insure a close contact of the adjacent faces of the extremities of the flange 49. Fig. 16 is a cross-sectional view of a clencher tire rim to which this improved method of attachment has been applied, and shows the upwardly projecting lug 35 formed integral with the channel 2 seated in the slot 37 formed in the flange 49 of the detachable split ring flange 5. Fig. 17 shows in elevation a split ring detachable flange formed in four sections. It has the continuous flange 49 heretofore described with adjacent pairs of sockets formed at the adjacent extremities of two sections, which are shown as butted at 50, 50 and as scarf-jointed at 51.

Figures 18, 19, 20, 21, 22, 23:
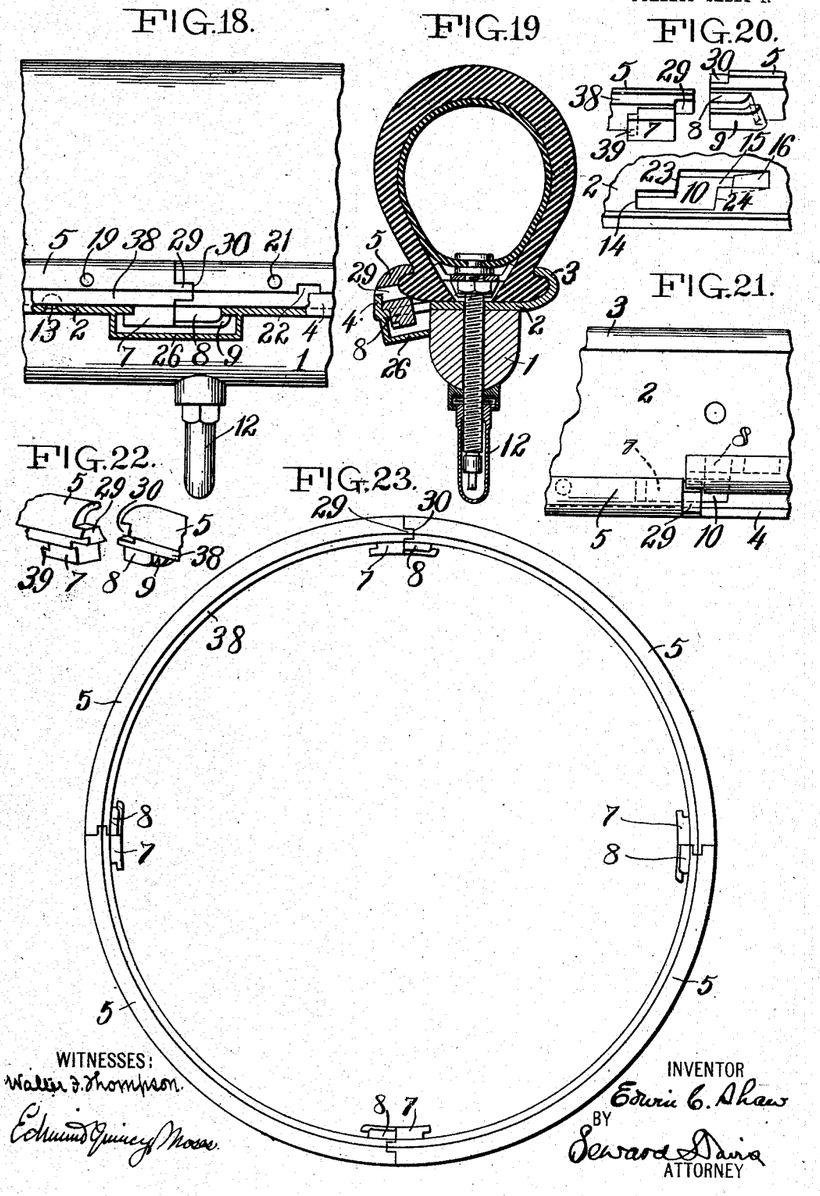
Figs. 18, 19, 20, 21, 22 and 23 illustrate a modification of my invention in which certain features found in the other modifications shown are combined in one device.

In Figs. 18 to 23 inclusive, a modification of my device is illustrated showing how some of the features of the other modification may be combined. Fig. 18 is a view similar to Fig. 3 showing a side elevation of a portion of a wheel felly 1 having mounted thereon a tire-seating member or channel 2 provided with a permanent tire-retaining flange 3 and a secondary flange 4. The split ring or tire-retaining flange 5 has a base portion 38 which seats upon the channel 2 and is held from outward movement by the secondary flange 4. The ends of the split ring, or if the ring is made in several sections as shown in Fig. 23, the abutting ends of adjacent sections are provided respectively with lugs 7 and 8 of the form shown in Figs. 1 to 5. Lug 7 is provided with a hook portion 39, and lug 8 with a stepped portion 9 which forms a backwardly projecting hook 40, as shown in the detail perspective views Figs. 20 and 22. The extremities of the split ring or of the ring sections, have mutually engaging locking means forming a dove-tail joint therebetween, 29 being the pin or tongue and 30 the socket or groove members thereof respectively, these parts being similar to the corresponding parts shown in Figs. 6, 7 and 8. Fig. 19 is a cross-section of the parts shown in Fig. 18, the section being taken through lug 8 and at the bottom of socket or groove 30. Figs. 18 and 19 show the dust casing 26 in section. Fig. 20 shows the lugs 7 and 8 above described, and also shows the slot 10 in the channel into which they enter, which is in all respects similar to that shown in Fig. 4. Fig. 21 is a plan view of a portion of the channel and ring extremities, showing the method of attachment. This is the same as in the form shown in Figs. 1 to 5. The lug 7 is first inserted in the slot and the ring or ring section turned until the hook 39 takes under the edge of the offset portion 14 of the slot. Lug 8 is then inserted in the portion 15 of the slot causing groove 30 to register with the adjacent tongue 29. The end of the ring bearing lug 8 is then pulled over till it is in alinement with the adjacent ring end, tongue 29 and groove 30 interlocking. The inclined wall 24 of the slot 10 serves to wedge lug 8 forward, thus causing the ring or ring section to seat solidly on the channel. Where several ring sections are used as illustrated in Fig. 23, they are successively attached in this way, beginning with the insertion of the lug 7 of any section.

It will be apparent that the several methods of locking herein described each admit of variations and changes within the spirit of the invention. Each of the methods and means here described is well adapted for particular classes of work, depending upon the severity of the strains to be imposed.

As has been stated, the means hereinbefore described of locking the detachable flange to the channel are adaptable to any type of rim for resilient tires, and I do not wish to be understood as limiting my invention to rims of the clencher type, particularly intended for pneumatic tires. The form of the extension of the channel intended to seat the detachable flange may be considerably varied, the inclined portion terminating in the flange 4, being replaceable by any equivalent construction, such as a downwardly disposed offset, the essential feature being that the upper edge of the retaining flange 4 shall be on a line with or below the main portion of the channel-iron, so that a tire may be slipped into place without stretching. The form of the retaining flange is likewise immaterial so long as there is provided the seat for the removable ring adapted to secure it from laterally outward movement, the pressure of the tire preventing inward movement of the detachable flange.

Practical use has demonstrated that this means for locking the split flange to the channel has ample strength to resist any strains which are met under conditions in severe usage, and that the resulting unitary structure being substantially integral approximates the strength of the old forms of rim, in which the flanges are formed integral with the channel. With double tube pneumatic tires the usual method of attachment by clips may be practiced if desired, a clip being placed opposite the joint of the split ring, and thus additional provision made for holding the parts in engagement. The clip may be mounted upon the tire valve stem, as shown in Fig. 2, where it consists of a plate having its lateral edges provided with upwardly and outwardly inclined flanges adapted to seat against the inner walls of the tire casing. To remove the tire under these conditions the clip, as in usual practice, is loosened, or in the case of pneumatic tires the tube is wholly or partially deflated. The ring terminal which bears the lug 8 is then forced inward until the lug can be disengaged from the slot, whereupon the split ring and the tire can easily be removed. The forms of the lugs and slots shown may be likewise varied. If desired, both tire flanges may be made removable by duplication of the split ring and the locking means, but in practice this has not been found to be necessary.

Having described my invention what I claim is:

1. In a vehicle wheel rim, the combination with a tire seating member, of a detachable split ring flange seating thereon, locking means for securing said parts together, and a dust-proof housing for said locking means.

2. In a vehicle wheel rim of the clencher type, the combination of a tire seating member and a detachable split flange adapted to seat thereupon, said member having female members adapted to engage projecting male members formed near the extremities of the said split flange, and positively unite the said flange and tire seating member in a unitary structure adapted to form one inwardly projecting clench, said locking means being adapted to prevent circumferential displacement of said flange, and other means comprising a secondary flange formed integrally with said tire seating member, adapted to prevent lateral displacement of said removable flange.

3. In a wheel rim, the combination with a tire seating channel of an upstanding detachable side-flange, the upturned edge of said channel retaining said detachable flange against side slip when locked to said channel, and means for positively interlocking said channel and flange, said interlocking means being integral with the channel and flange, and securing said flange against circumferential and radially outward movement.

4. In a wheel rim, the combination with a tire seating channel of a split ring forming a detachable flange, an off-set slot formed in said channel, one extremity of said slot comprising a downwardly beveled groove adapted to guide a downwardly projecting stepped lug formed upon one extremity of said split ring into position after a downwardly projecting rearwardly hooked lug upon the other extremity has engaged within the opposite extremity of said slot, all lateral faces of the said slot being substantially parallel but sloped toward said guide to permit of a wedging engagement with said stepped lug when said lug is sprung laterally past said guide slot into alinement with said hooked lug, the lower portion of said stepped lug forming the lateral projecting hook taking under the inward side of said slotted channel, the said lugs and slots comprising means preventing lateral and circumferential movement of said detachable flange.

5. In a vehicle wheel rim, the combination with a tire channel of a detachable split ring flange having locking means integral therewith adapted to engage locking means integral with the tire channel, and a dust-proof housing formed below said channel and inclosing said locking means.

6. In combination in a wheel rim, a tire seating member, a detachable split flange therefor, lugs on the ends of said flange, said tire seating member being slotted to receive said lugs, said lugs being hooked to engage beneath portions of said tire seating member, one of said lugs being seated by a circumferential movement of said flange and the other by a lateral movement thereof and means on the tire seating member for preventing outward lateral movement of said flange, being in engagement with said means when said lugs are so seated.

7. In combination in a wheel rim, a tire seating channel, a removable cross split tire flange therefor, and means for securing said flange to said rim comprising reversely hooked lugs formed upon the terminals of said split ring, a slot in the channel adapted to receive the said lugs, and means for locking the lugs within the slot and to the channel.

8. A vehicle wheel rim adapted to use with resilient tires consisting of a tire seating channel, a transversely split removable flange ring, mutually interengaging means upon adjacent ends of the ring for locking the ends of said rings together, and means for locking said ends directly to the tire seating channel, means for preventing the disengagement of said ends, and means for immovably securing the said ring against lateral displacement and against turning, under the force of the internal pressure and other strains to which the rim and tire are subjected.

9. The combination in a wheel rim of a tire seating channel, a sectional, detachable tire-flange therefor, and means for securing the sections of said flange to said channel comprising pairs of hooked lugs formed upon the terminals of said sections and a plurality of offset slots in the channel adapted to receive and hold said lugs, each slot holding a pair of said lugs.

10. In combination in a wheel rim, a tire seating channel, a detachable upstanding cross-split side tire-flange therefor, and means for locking said flange to said channel comprising a retaining groove upon said channel, two hooked lugs upon said detachable member, an offset slot in said channel adapted to receive said lugs, and means for retaining said lugs within said slot and in engagement with the channel.

11. In a vehicle wheel rim, means for locking a detachable split tire-flange to the main portion of the rim comprising a groove upon said main portion forming a seat for said detachable flange, hooked lugs upon the terminals of the detachable flange and an offset slot in the said groove adapted to receive these lugs, said slot comprising the main portion adapted to hold said lugs when contacting in longitudinal alinement, the hooks extending beyond the slot edges, and an offset portion of sufficient size to admit one lug and its hook.

12. In a wheel rim, the combination of a tire seating channel a removable upstanding side flange therefor consisting of a ring transversely split and adapted to seat in a groove in the rim channel, the ring being provided near and at each side of each point at which it is split with fixed means formed upon the ring portion normally adapted to enter into tension resisting locking engagement with corresponding means formed in the rim channel, substantially as set forth.

13. The combination in a vehicle wheel rim of a tire seating member, and a detachable member comprising a tire-flange mounted upon a transversely split ring, the terminals of said split ring being provided with downwardly extending reversely hooked lugs adapted to enter and positively lock within a slot in said tire seating member, said tire seating member being provided along its edge with an upwardly extending flange adapted to form a retaining seat for said split ring.

14. A vehicle wheel rim comprising a tire seating channel, a transversely-split tire-retaining flange, and means integral with said flange for securing its ends to the channel in wedging engagement.

15. In a vehicle wheel rim, the combination of a tire seating member, a tire retaining flange formed upon a transversely split ring, and means for securing said split ring to the tire seating member, said means comprising lugs integral with the ends of said split ring, and a slot in the tire seating member, said slot being shaped to hold the lugs in wedging engagement when the split ring is forced laterally outward and to release them when the split ring is forced laterally inward.

16. In a wheel rim in combination, a main member comprising a portion adapted to form a seat for a resilient tire, and a portion extended laterally beyond the tire seating surface, a detachable flange seated upon said laterally extended portion outside of the base line of the tire and adapted to retain the tire against lateral movement, and mutually coöperating means carried by and fixed with relation to said main member and said tire flange respectively locking said flange against outward circumferential and lateral movements.

17. The combination in a vehicle wheel rim of a detachable flange and a channel comprising a tire seating portion and tire retaining flange integral therewith, and a portion also integral therewith adapted to seat said detachable flange, said last portion comprising a downwardly and outwardly projecting extension of the tire seating portion having an upwardly projecting flange at its outward edge, and containing in its downwardly projecting part a stepped slot adapted to engage projecting lugs formed beneath said detachable flange, said detachable flange comprising a split spring ring whose opposed extremities terminate in male and female members respectively adapted mutually to engage and carrying the said lugs adapted to enter said stepped slots, one of which lugs hooks beneath said channel.

18. In a wheel rim in combination, a channel provided with a removable split side flange, a slot in the main part of the channel, and a lug on each end of the flange, each lug being normally in tension resisting engagement with an end of the slot.

19. In combination in a wheel rim, a tire seating channel, a detachable split flange therefor, a lug on each end of the flange, and a slot in the channel to receive a pair of lugs, said slot having a portion offset therefrom in a circumferential direction.

20. In combination in a wheel rim, a tire seating channel, a detachable split flange therefor, a lug on each end of the flange, and a slot in the channel to receive a pair of lugs, said slot comprising a main portion and two portions offset therefrom in opposite directions circumferentially.

21. In combination in a wheel rim, a tire seating channel, a detachable split flange therefor, means for securing one end of said flange to said channel comprising a lug on one of said members and a slot in the other to receive the lug, said slot having an inclined end coacting with said lug to draw the end of said flange in a circumferential direction during the seating of the flange upon the channel, and means for securing the other end of said flange to said channel.

22. In combination in a wheel rim, a tire seating channel, a detachable split flange therefor, means for securing one end of said flange to said channel comprising a lug on one of said members and a slot in the other to receive the lug, the slot having an inclined end and a portion offset in a circumferential direction, and means for securing the other end of said flange to said channel.

23. In combination in a wheel rim, a tire seating member, a detachable split flange therefor, lugs projecting downwardly from said flange at each side of the split therein, said tire seating member being recessed to receive said lugs, an end of said recess being inclined to the plane of rotation of the wheel.

24. In combination in a wheel rim, a tire seating member, a detachable split flange therefor, integral lugs projecting downwardly from said flange at each side of the split therein, a slot in said tire seating member to receive said lugs, said slot having an end formed at an inclination to the plane of rotation of the wheel, said tire seating member being provided along its edge with an upwardly extending flange adapted to form a retaining seat for said detachable split flange.

25. In a wheel rim, a tire seating member having a slot therein, a detachable split flange seating on said member and provided at one end with a downwardly projecting lug adapted to enter said slot, said lug being hooked to engage beneath a portion of said tire seating member, and being seated by a circumferential movement of said flange, means on the tire seating member for preventing outward lateral movement of said flange, portions of said flange being in engagement with said means when said lug is so seated, and means to retain the other end of said flange against radially outward movement.

EDWIN COUPLAND SHAW.

Witnesses:
C. C. GOODRICH,
W. K. MEANS.